United States Patent Office 3,523,988
Patented Aug. 11, 1970

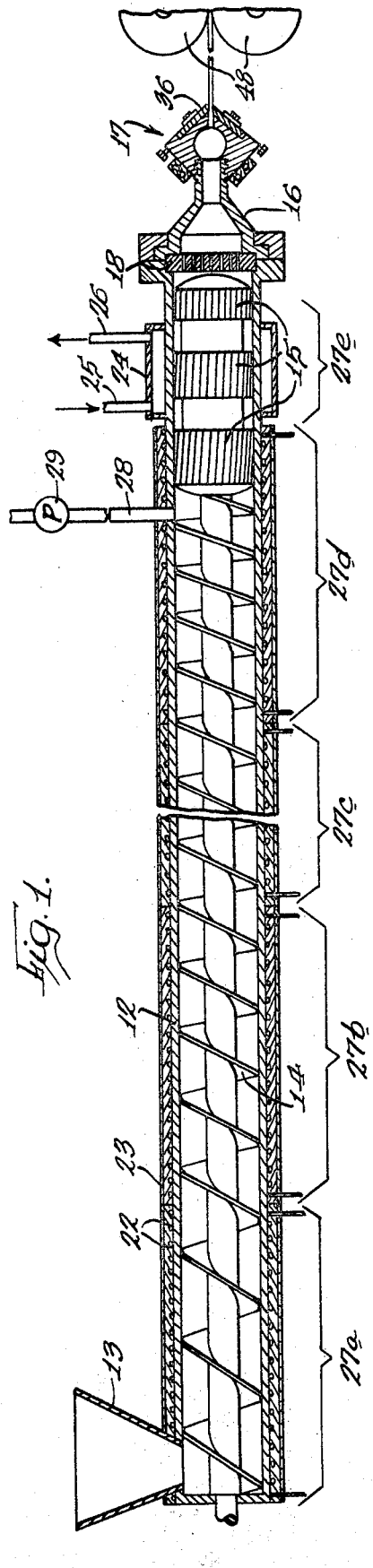
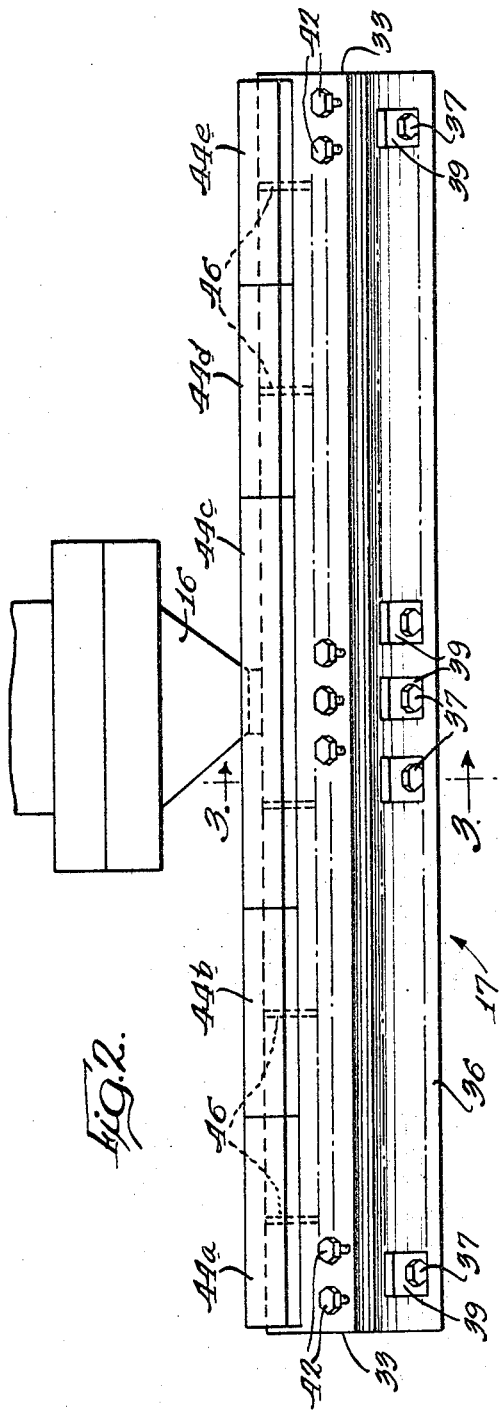

3,523,988
METHOD OF MAKING LARGE CELLED PLASTIC MATERIALS WITH INTEGRAL SKINS
Zbislaw M. Roehr, Miami, Fla., Richard Berger, Yonkers, N.Y., and Paul A. Plasse, Lexington, Mass., assignors, by mesne assignments, to said Berger and to said Plasse, both % Roehr Metals and Plastics Company, Waterbury, Conn.
Filed Mar. 22, 1965, Ser. No. 441,417
Int. Cl. B29d 27/00
U.S. Cl. 264—41       5 Claims

ABSTRACT OF THE DISCLOSURE

A method of making large cell polypropylene or other polyolefin plastic cellular material having connate thick skins and large cell size, involving delivering the polyolefin through an extruder at melt temperature and in mixture with a foaming agent and a nucleating agent so that the mixture is delivered from the die slot under proper back pressure maintained on the melt to prevent foaming before reaching the die slot while permitting the major portion of foam and thick skin formation within and between the die slot. The foamed material is delivered from the die slot directly through an expansion chamber slightly larger than the die slot where foaming is substantially completed.

---

This invention relates to cellular structures having facing skins and a method and apparatus for making such structures. Further, this invention relates to continuous compression molding and more particularly to a foamed extrusion method and to an advantageous cellular product which can be produced by such method.

Cellular sheets such as panels have, in the past, been produced by fusing or adhesively affixing facing skins to a cellular core or by producing the skins by curing a resin mix in situ on the core. The core could be of honeycomb or like open structure or could be of a closed plastic foam material. Where such structures are to be used as structural materials, e.g. as shipping container walls, the skins of the structure should be sufficient in strength to resist impact and wear and to protect goods contained within the container. Where the materials are to be used as insulation, a foamed or other cellular central portion is also important.

Foamed sheets useful as cores or central portions in such structures have been prepared, e.g. by compression molding, and have then been faced with various skin materials. However, as far as is known, there has not heretofore been provided a sheet having a foamed or other cellular core portion and a skin portion formed from a single continuous extrusion or compression molding operation.

It is a general object of this invention to provide a new and useful sheet having a cellular core portion and a skin portion derived from a single molding or extrusion operation.

Another object of this invention is to provide a new and useful method by which such a sheet can be produced and to provide an apparatus in which the method can be carried out.

A further object of this invention is to provide a new and useful continuous method for extruding or compression molding a thermoplastic material while employing a foaming agent during shaping of the thermoplastic material with a die or mold in such manner as to produce a structure having connate solid skin and cellular core portions.

At the present, two methods involving foaming agents are normally used for producing cellular plastics and especially cellular polyolefins. These methods are direct extrusion and compression molding. For extruding a polyolefin or the like, a resin pellet may be coated with a foaming agent and fed into an extruder and extruded through a die to the desired shape under carefully controlled conditions. The chemical foaming agent decomposes in or close to the head of the extruder and an expandable material, formed from the decomposition, is distributed within the molten plastic as it moves through the head and die. Expansion of the material takes place only after the material emerges from the die. In extruding polyolefins in such a manner, in order to obtain a closed cell structure with a smooth pinhole-free surface it has been necessary to retain the degree of blow less than about 100%, thereby producing a relatively high density product. Further, no discernible skin is formed on the product and the product usually has undesirable surface corrugations so that application of skins to the sheet would be difficult, if not impossible. The pin-hole-free surface layer usually has about the same thickness as the cell walls within the product and at least less than twice the thickness of cell walls.

Compression molding techniques for producing cellular polyolefins usually involve the dispersing of a suitable blowing or foaming agent in the polyolefin resin, placing the resin in a mold and heating slowly to a temperature which is predetermined by the thermal properties of the particular resin and foaming system. The resin and foaming agent must be judiciously chosen to assure that the decomposition of the foaming agent occurs in a temperature range in which the resin possesses a suitable viscosity to retain the liberated and expanding gas or bubbles. After decomposition of the foaming agent has been completed, the foamed structure is carefully cooled to room temperature so that distortion and rupture of cells is not caused. Such compression molding is carried out on a batch-by-batch basis. The molded foamed mass is then sliced into cellular sheets and the sliced sheets can be faced with a skin material where it is desired to form a cellular sheet structure having skins.

A more particular object of this invention is to produce a plastic sheet having connate cellular core and solid skin portions by heating a thermoplastic material, e.g. in an extruder barrel, to a temperature above the extrusion or molding temperature for the material, adding a foaming agent, intimately mixing the foaming agent with the thermoplastic material to disperse the foaming agent therein while cooling the thermoplastic material to extrusion temperature, forming the mixture of thermoplastic material and foaming agent into an elongate shape, extruding the material as a wide thin sheet laterally from the elongate shape through a die or mold and permitting expansion of the foaming agent and foaming of the thermoplastic material to the major portion of its ultimate size while the material is passing through the die or mold.

Yet another object of this invention is to provide a method for producing a cellular plastic sheet in which a thermoplastic material is passed through a die or mold and is expanded within the die or mold in such manner that a major portion, at least 80%, e.g. about 85%, of the foaming expansion takes place in the die or mold and most of the remaining expansion takes place in a limiting expansion chamber which receives the foamed material from the die or mold.

Also, it is an object to provide an apparatus for the manufacture of products according to any of the foregoing objects.

Another object of this invention is to provide a new and useful sheet or method according to any of the foregoing objects in which the plastic material of the skin portion of the sheet can be produced as a tough skin of excellent strength.

A further object is to provide a method according to any of the foregoing objects in which the skin thickness of the product produced can be controlled to produce skins having sufficient thickness for good protection so that the product finds particular use as a rigid insulating structural material.

Still another object is to generally vary the ratio of the skin material thickness to the cellular core material thickness to a desired ratio in any of the foregoing objects.

Another object is to provide a new and useful method according to any of the foregoing objects in which the cell size of the cellular material in the product formed is controlled to produce a material having a very low density, preferably less than one-quarter of the density of the thermoplastic material from which the structure is formed.

Still another object is to provide a new and useful sheet according to any of the foregoing objects in which the skins are formed by compacting cellular material during the extrusion or molding operation. It is also an object to provide such an article in which at least a major proportion of the cells are interconnected with or open to other cells.

Yet another object is to provide a new and useful method and apparatus according to the foregoing objects in which a sheet structure 4 ft. in width can be produced on a continuous basis and can be recovered as a rigid sheet on a continuous basis from the die or mold.

Other objects of this invention will be apparent from the following descriptions and from the drawings in which:

FIG. 1 is a diagrammatic drawing in section of the components of an arrangement of apparatus according to the invention;

FIG. 2 is an enlarged fragmentary top plan view of the apparatus shown in FIG. 1;

Figure 3:
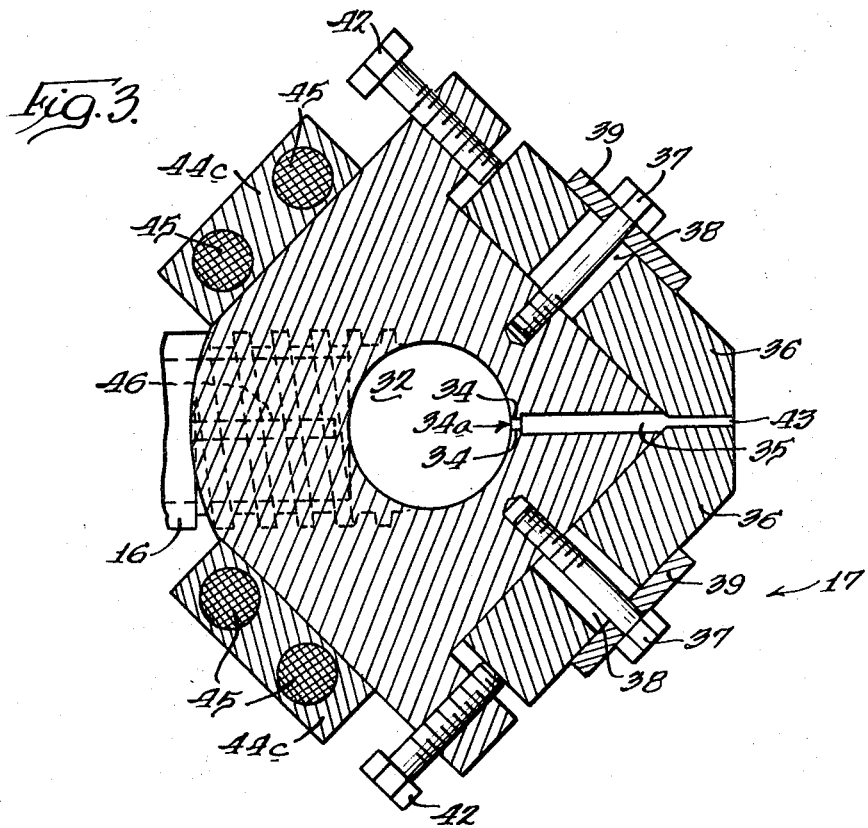
FIG. 3 is an enlarged section taken along the line 3—3 of FIG. 2.

The form of apparatus illustrated in FIGS. 1–3 is basically an extruder which has been adapted for the purposes herein. The extruder includes a cylindrical barrel 12, a hopper 13 at the inlet end of a barrel 12, a screw 14 for moving material from hopper 13 through barrel 12 to the outlet end thereof, and a mixing head or torpedo 15 at the downstream end of screw 14 and affixed to screw 14 for rotation therewith near the outlet end of barrel 12. A hollow adapter 16 is removably secured by a suitable threaded connector to the outlet end of barrel 12, and an extruder head 17 is removably secured by threads to the other end of adapter 16. Adapter 16 is merely a connector for connecting the extruder head 17 to the barrel 12 providing a flow path from the exit of barrel 12 into extruder head 17. A stationary perforated plate 18, through which plastic melt may pass from barrel 12 into adapter 16, is removably secured between adapter 16 and barrel 12.

Heating means for barrel 12 are provided in the form of a plurality of separate heating coils 22, one heating coil for each of a plurality of heating zones 27a through 27d. Surrounding heating coils 22 is a suitable insulation wrap identified by reference numeral 23. Between the last heating coil 22 and the exit end of barrel 12 there is provided a jacket 24 surrounding barrel 12. Jacket 24 has an inlet 25 and an outlet 26 so that cooling liquid, e.g. water, can be flowed through the jacket to cool the last zone of barrel 12, identified as zone 27e.

Zones 27a through 27d are provided to heat the plastic material to above extrusion temperature by the time the plastic material is conveyed by screw 14 to zone 27d. Zone 27d can be staged above zones 27a through 27c in temperature to assure that the plastic melt is brought up to above extrusion temperature.

A foaming agent inlet 28 is provided at zone 27d for introducing foaming agent into the plastic material while the plastic material is above extrusion temperature. A suitable metering piston pump 29, e.g. of the fixed displacement and variable speed and stroke type, is provided for metering the foaming agent through inlet 28 into barrel 12. Inlet 28 is connected beyond pump 29 to a suitable supply of foaming agent, not shown.

Only that portion of the extruder which is useful in explaining the present invention has been shown, and it is to be understood that suitable mountings for securing and supporting barrel 12, suitable conveyor means for feeding plastic material to hopper 13, in addition to other attentive equipment, normally used in extruding systems may be used herein.

Turning now more particularly to FIG. 3, the extruder head 17 includes a transverse manifold or distribution chamber 32. The ends of chamber 32 are capped or plugged or otherwise sealed such as by end plugs indicated at 33. Chamber 32 receives extrudable plastic material from barrel 12 via adapter 16 and distributes the material transversely for extrusion or molding of the material through a transversely elongated slot 34a, which may be considered as either a die slot or mold slot and which is defined between facing parallel surfaces of opposing transversely elongated mold walls 34 defining the exit from distribution chamber 32.

Beyond walls 34 there is provided an expansion chamber 35 which is also a transversely elongated slot and, like the die slot, has opposing generally parallel transversely elongated walls.

A pair of opposing lip plates 36 are provided at the exit end of the expansion chamber 35 for the purpose of restricting the exit of foam material from expansion chamber 35 to create a back pressure on the material in distribution chamber 32 and slot 34a so that even flow from chamber 32 into slot 34a is provided throughout the width of the extruder head. Lip plates 36 are each mounted by suitable bolts 37 extending through slots 38 in lip plates 36 and threaded into the extruder head. A plate 39 is provided for each bolt 37 and functions to clamp the lip plate 36 in any position to which it has been adjusted within the limits of slot 38. A plurality of adjusting screws 42 are provided so that, upon loosening bolts 37, each of lip plates 36 can be adjusted toward or away from each other across the outlet end of expansion chamber 35. Bolts 42 limit the movement of the lip plates 36 away from each other and permit fine adjustment of the spacing between the lip plates 36. After adjustment of the lip plates as desired, bolts 37 can be retightened to clamp the lip plates in adjusted position with the desired restriction or restricted discharge orifice 43. Discharge orifice 43 is the discharge orifice from the extruder head.

As a more specific example, head dimensions can be used as follows:

Transverse dimension of distribution chamber 32—4 ft.
Transverse dimension of die slot 34a—4 ft.
Transverse dimension of expansion chamber 35—4 ft.
Transverse dimension of discharge orifice 43—4 ft.
Normal distance between walls 34—0.14 in.
Normal distance between the opposing flat walls of chamber 35—.16 in.
Thickness of discharge slot or orifice 43 between plates 36—.09 to .10 in.
Inner diameter of the tubular distribution chamber 32—1.6 in.
Length of die or mold, i.e. distance or dimension of walls 34 between chamber 32 and chamber 35—.09 to .10 in.
Length of chamber 35 between slot 34a and lip plates 36—1.5 in.

The transverse dimension of chamber 32 in the illustrated form is divided into five zones, the central one of which is approximately double the length of the other four. These zones are defined by separate heaters 44a through 44e, each of which heaters includes heating means in the form of brass cartridge electrical heaters shown at 45. A thermocouple 46 is also provided in a well in each zone for detecting the temperature of the zone. The separate zones of temperature are provided so that the zones further from the entry into chamber 32 from adapter 16 can be heated to a progressively slightly higher temperature to assure fully even flow throughout the manifold chamber 32, thereby supplementing the action of the lip plates 36. Each of the heaters 44a through 44e is responsive only to the thermocouple 46 in the same zone so that a preselected temperature is maintained independently in each zone.

In general operation of the extruder system, thermoplastic material, e.g. in the form of pellets or granules, is introduced into barrel 12 through hopper 13 while screw 14 is turned by sutiable motor means, not shown, to advance the thermoplastic material through barrel 12 toward the outlet end theerof. As the thermoplastic material progresses through the barrel, it finally reaches its maximum temperature in zone 27d and the foaming agent, e.g. nitrogen gas, is introduced by pump 29 through inlet 28. The mixer head or torpedo 15, turning with screw 14, receives the mixture of resin and foaming agent and intimately mixes the foaming agent with the resin while the resin is being cooled by flow of cooling fluid through jacket 24. The resin is forced through the apertures in plate 18 for further mixing and then through adapter 16 and transversely in chamber 32, a back pressure being applied by the restriction defined by lips 36. The resin is extruded between die walls 34, and it is during its travel between these walls that the major portion of foaming takes place due to a pressure drop releasing the foaming agent to gaseous state. The resulting extruded substantially solidified foam is permitted to further expand in expansion chamber 35 and is then discharged through orifice slot 43.

The upper and lower walls of chamber 35 are preferably properly spaced so that they are engaged by the surfaces of the product sheet as the product proceeds through the chamber 35. Providing the walls of chamber 35 at the limit of the sheet expansion helps to flatten and finish the surfaces of the skins formed on the sheet.

A system can be provided for receiving and conveying the product away from the discharge orifice 43 of the extruder. Accordingly, there is shown in fragment in FIG. 1 a pair of opposing spaced rollers 48 having their nip generally aligned with the discharge orifice of the extruder head for receiving the extruded material within the nip. For example, the rollers may be spaced about 12 in. from the discharge orifice and can be spaced from each other slightly less than the thickness of the sheet leaving orifice 43. The rollers, if desired, can function to further smooth the skin surfaces where a surface smoother than that coming from the die is desired. The rollers are driven at a speed merely sufficient to convey the product away from the extruder, producing no drag on the product sheet which might tend to pull material from between the extruder dies prior to substantial completion of the foaming. The rollers 48 may be in the form of hollow drums which are cooled by water or the like to eliminate accumulation of heat pick-up from the extruded sheet.

The method of this invention is a method of continuous compression molding in which a thermoplastic material is continuously passed through a mold or die while the plastic material is heated to an extrudable or moldable state. The material in the die is continuously compressed while solidifying and is continuously withdrawn from the compression zone in a substantially solidified form. Preferably the mold is of a configuration to produce a sheet as an end product.

The present method can also be considered as a form of extrusion in which a foaming agent is included in and mixed with the feed material prior to passing the feed material through the extruder die. The foaming agent foams within the die and provides the compressing force during the compressing step, by expansion from the interior of the plastic mass.

More particularly, in a preferred form a continuous stream of thermoplastic material is provided, e.g. as charged through an extruder barrel, and is continuously heated to an elevated temperature above its extrusion temperature, e.g. in the case of polypropylene to a temperature in the range of 300–450° F. A foaming agent is then introduced and intimately mixed with the thermoplastic material melt while the thermoplastic is confined against expansion. The thermoplastic mixture is then delivered through a zone of decreased temperature to decrease the temperature of the thermoplastic material to its proper extrusion temperature, e.g. in the range of 200–400° F. and more usually about 315–360° F. in the case of polypropylene.

The mixture of thermoplastic material and foaming agent is then delivered to a distribution or forming chamber where the material is shaped into an elongated mass. Material is delivered from the elongated mass laterally of its elongated shape through the mold or die. While in the mold or die, pressure at the leading end of the material is reduced sufficient to permit foaming of the plastic material in its direction of movement to approximately the fullest extent of its ultimate longitudinal and transverse size. The resulting sheet is passed through an expansion zone in which the material is permitted to expand in thickness to approximately its final sheet thickness. Sufficient back pressure is applied to the sheet material to assure uniform distribution through the die, but the back pressure is insufficient to prohibit foaming within the die.

It has been found, for example, that bringing the lip plates of the above described apparatus together to form a gap in the range of .02 to .03 in. creates a severe pressure drag, sufficient to back pressure up in the whole system so that foaming will not occur in the die. Under such circumstances, the foaming occurs outside the die, resulting in a fluffy material having pronounced and often undesirable surface corrugation.

Although exemplary temperatures have been given for the use of polypropylene as the thermoplastic material, it is to be understood that these are merely exemplary and each thermoplastic material of a different type used as a feed to the method may require different extrusion temperatures. These temperatures are known for each of the commonly used extrudable thermoplastic materials and such temperatures can be used in this method.

Plastics which may be used in the method comprise extrudable thermoplastic materials and include, but are not limited to, the polymers, including homopolymers, copolymers, tripolymers, interpolymers, etc. of the following polymerizable monomers: aliphatic monoolefins such as ethylene, propylene, butene, isobutene, pentene, the methylbutenes, methylpentenes and methylhexenes, etc.; monoethylenically unsaturated aromatic hydrocarbons and derivatives thereof such as styrene, vinyltoluene, vinylxylene, ethylvinylbenzene, p-chlorostyrene, m-chlorostyrene, p-isopropylstyrene, p-bromostyrene, ethylvinyltoluene, vinylnaphthalene, etc.; the vinyl halides such as vinyl chloride, vinylidene chloride; vinyl esters of carboxylic acids such as vinyl acetate, vinyl butyrate, vinyl stearate, vinyl benzoate; vinyl esters such as vinylmethylether, vinylethylether, vinylisobutylether; unsaturated carboxylic acids and derivatives thereof such as acrylic acid, methacrylic acid, methyl acrylate, ethyl acrylate, methyl methacrylate, acrylamide, acrylonitrile, methacrylonitrile, etc., and the like. Interpolymers of the above with other ethylenically unsaturated compounds such as alpha,beta-unsaturated polycarboxylic acids and derivatives thereof such as maleic anhydride, dibutyl fumarate, dipropyl maleate and dienes such as butadiene, isoprene, chloroprene, divinyl benzene, diesters of allyl alcohols with dicarboxylic acids, etc., may also be useful. The polymers of α-monoolefins are preferred and, of these, polymers of propylene are especially preferred.

The usual foaming agents for thermoplastics, also known as expanding or blowing agents, can be used although gaseous foaming agents are preferred. The gaseous foaming agents include such gases as nitrogen, argon, neon, helium, air, ammonia, carbon dioxide, and mixtures thereof. These may be introduced into the plastic material in the form of compressed gases or in the form of materials which react or coreact to form the gas in situ. Also useful, either alone or in combination with any of the above, are the normally gaseous organic compounds, among which are the halogen derivatives of methane and ethane such as methyl chloride,
methyl bromide,
ethyl chloride,
chlorodifluoromethane,
dichlorofluoromethane,
trichlorofluoromethane,
dichlorodifluoromethane,
difluorotetrachloroethane,
dichlorotetrafluoroethane,
difluorochloroethane and
1,1-difluoroethane Other gaseous compounds useful as foaming agents are methane, ethane, propane, butane, isobutane, 2,2-dimethylpropane, cyclopropane, ethylene, propylene, butene, isobutylene, acetylene, butadiene, monomethylamine, dimethylamine, trimethylamine, and ethylamine. Additional useful foaming agents are known and will be evident to those in the art. Excellent products have been obtained using butane as the foaming agent for propylene, usually using less than about ten percent butane based on propylene.

It is intended that other conventional additive ingredients can be added in conventional amounts to the extrudable plastice for various purposes as desired and as known to the art. Such ingredients include light stabilizers, heat stabilizers, pigments, dyes, fillers, plasticizers, and the like. We have also found that in some cases it may be desirable to incorporate from 1 to 10% of an elastomer of a type compatible with the polymer melt.

In a preferred form of the invention a small amount, e.g. .005 to 2.5% and preferably .05 to .25% of a nucleating agent can be used to control the size of the cells in the product. Such nucleating agents include surface active compounds and especially polycarboxylic acids such as citric acid and finely divided solid materials, e.g. metal soaps of fatty acids such as zinc stearate and magnesium stearate, metal silicates such as calcium silicate hydrate, exploded mica, wood floor, carbon black, metal oxides, talc and silica gel. Preferably, the nucleating agent is one which functions as a lubricant, e.g. a polycarboxylic acid or a metal soap of a fatty acid or mixtures thereof, since it is believed that the lubricant functions as a slip agent at the surface of the plastic melt material as the material passes through the die, modifies the surface tension and viscosity of the material and thereby assists in forming tougher skin portions of the product which are believed to be of biaxially oriented plastic. The lubricant or slip agent is also included in the feed where continuing lubrication of the mold walls is desired during molding. Other lubricants normally included in moldable plastics for mold release purposes can be used herein in lieu of or in addition to a lubricating nucleating agent.

Figure 4:
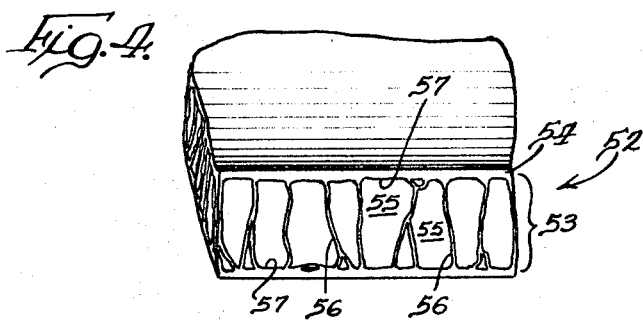
FIG. 4 is a sketch illustrating in broken section one form of sheet produced according to this invention.
Figure 5:
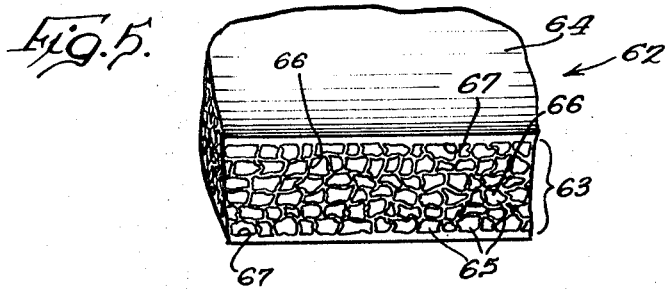
FIG. 5 is a sketch illustrating in broken section another form of sheet produced according to this invention.

Turning now to FIGS. 4 and 5, two forms of product produced by the method and in the apparatus of this invention are illustrated. The products are both sheets, indicated generally at 52 and 62, having cellular cores or central portions 53 and 63 and outer skin portions 54 and 64 formed by cellular material compacted against the central portions. In the cellular portions 53 and 63, cells 55 and 65 are defined by cell walls 56 and 66 between cells and the generally flat inner surfaces 57 and 67 of skins 54 and 64 which cover or close the surface cells.

In the form of FIG. 4, the central cellular portion 53 is an average of one cell in thickness while in the form of FIG. 5 the central portion 63 is an average of about six cells in thickness. Products having cellular portions of an average thickness between one and six cells or greater than six cells can also be and have been provided in accordance with the present invention, by the method described herein.

In order to more specifically exemplify the invention, a formulation was prepared by admixing .025 part by weight calcium stearate (mold lubricant and nucleating agent) and .025 part by weight citric acid (nucleating agent) with 100 parts by weight mixed polypropylene having a melt index in the range of 4–8. The resulting formulation was used in each of the examples given below.

Also, the apparatus described in FIGS. 1–3 was used in each example below. The apparatus dimensions were those specified in the table hereinabove. The heating coils for heating zones 27a, 27b and 27c were at a temperature of about 375° F. and the coil in zone 27d was at a temperature of about 400° F. so that as the thermoplastic was conveyed through the extruder barrel by screw 14 the thermoplastic melt was brought up to a temperature between about 375° F. and 400° F. in zone 27d. Water at a temperature of about 180° F. was passed through the jacket 24 of zone 27e, resulting in cooling of the thermoplastic mass, after addition of the foaming agent in zone 27d, to a temperature in the range of about 315–360° F. The heaters 44a through 44e were set to provide an average die temperature of about 320° F., zone 44c being at about 315° F. and zones 44a and 44e being at about 325° F.

The following examples are for the purpose of illustrating the invention and are not intended as limiting the invention:

Example I

Granular material of the above described formulation was introduced through the hopper 13 into the extruder barrel 12 and the extruder was operated as described hereinabove. As the thermoplastic material passed through zone 27d, nitrogen gas was metered by pump 29 to provide 5% by weight nitrogen based on the thermoplastic material. The thermoplastic material was distributed evenly throughout the distribution chamber 32 and was extruded at the average extrusion temperature of 320° F. A sheet which was about 3/16 in. thick and 4 ft. wide and similar in internal structure to that shown in FIG. 5 was produced.

Example II

The procedure of Example I was repeated except that 4 parts by weight butane were used in lieu of the 5% by weight of nitrogen. A similar 3/16 in. thick by 4 ft. wide sheet was formed.

Example III

Another formulation like that of the formulation used in the above examples was prepared except that the amounts of calcium stearate and citric acid were reduced to about .005 part by weight per 100 parts by weight polypropylene. The procedure of the above examples was repeated using this formulation, and using 4 parts by weight butane as the foaming agent. The resulting 4 ft. wide sheet was about 3/16 in. thick and had a core in which the majority of the bubbles were closed by both of opposing skins, i.e. a core of one bubble thickness, as shown in FIG. 5. However, the overall thickness of the product was the same as the thicknesses of the products of Examples I and II.

In each product, the lateral edges of the sheet produced were formed of skin interconnections and integral with the skins of the top and bottom faces of the sheet. Also in each product, the cell size was uniform across the width of the sheet.

Numerous experiments have been conducted using the method of this invention. Generally, it has been found that 300% blowing or expansion of a plastic material can be obtained using about 5% blowing agent. Varying the amount of blowing agent results in direct variation in the amount of expansion within a reasonable range of foaming agent use.

In each of the above experiments, the polypropylene of the starting formulation had a density of about 58 lbs./cu. ft. and the densities of the products ranged from about 20 lbs./cu. ft. in Example I down to about 12–14 lbs./cu. ft. in Example III. From such a starting material, it has been found that products having densities as low as 10 lbs./cu. ft. or lower can be prepared.

The method can be controlled to vary the bubble or cell size in the product. Accordingly, products have been prepared having cell sizes as low as .025 in. and as high as .2 in. in diameter for sheets on the order of 1/8 to 3/8 in. thick. Increasing the amount of nucleating agent will increase the number of cells and thereby decrease the cell diameter while use of little or no nucleating agent will tend to decrease the number of cells and increase the cell diameter. Thus, the cell diameter can be controlled over a wide range. In the preferred sheets, the total sheet thickness to cell diameter ratio is about 1.5:1 to 10:1.

The method can also be controlled to vary the skin thickness. Thicker skins are provided by the use of more lubricant or slip agent, the use of a greater die length through which the plastic material passes and/or a slight increase in the die temperature. The length of the expansion chamber may also tend to affect thickness slightly. The increased length in die permits more foaming, resulting in collapse of more foam bubbles as they are compressed against the die surfaces from the interior of the plastic, resulting in a thicker skin.

Other controls can be imposed on the method according to normal foaming, compression molding and extrusion control techniques.

The longitudinal and transverse expansion of the plastic sheet is apparently complete before the plastic sheet exits the die. The only expansion in the expansion chamber appears to be an expansion in thickness. Also prior to leaving the die, the skin has been formed from collapsed cells or bubbles and the lack of foaming in the skin indicates that no significant new foaming commences beyond the die. Thus, in the expansion chamber, the expansion and thickness is apparently due to expansion of foam which has already been formed, and not due to any new foaming beyond the die which could puncture the skin. The skin is free from pinholes.

It is an advantage of the present invention that cellular sheet materials having skin facings can be produced on a continuous operation. The method results in connate formation of the cellular core and skins, and sheets as wide as 4 ft. or wider can be produced with uniform bubble or cell distribution across the width of the sheet. It is only necessary to cut such sheets to the desired length, although the sheets may also be cut to or formed in other widths. The skins on the sheet are relatively thick compared to the cell walls and are substantially free of corrugations and pinholes. Many of the cells in the core, usually the major proportion of the cells, are interconnected rather than being in the form of individual bubbles. The interconnecting of the cells is believed to result from the pressure gradient along the direction of travel of the material through the die which tends to rupture the cells as they are formed within the die.

The product cellular sheet material has a lower than normal density, usually in the range of 10–30 lbs./cu. ft., although still lower or even higher densities can be achieved.

As another advantage, the skins in the products of this invention have unusually good physical properties, e.g. toughness. Such properties may result from biaxial orientation of the polymeric material as it passes through the die. In the die, the material is being expanded in both longitudinal and transverse directions while in a heated condition to stretch the skin polymer biaxially. Such stretching can result in orientation of the polymer molecules such as to enhance physical and/or optical properties of the polymer.

All percentages given herein are percentages by weight unless otherwise indicated.

The foregoing detailed description is given for clearness of understanding only and no unnecessary limitations are to be understood therefrom, as some modifications will be obvious to those skilled in the art.

We claim:

1. A method of producing a rigid, tough skinned cellular polyolefin material of large cell size which comprises heating a thermoplastic polyolefin material containing a small amount of nucleating agent in the range of .005 to 2.5 weight percent in an extruder having an outlet die slot to form an extrudable melt, adding foaming agent to the melt while containing the melt against expansion in the extruder before it reaches the die slot, expanding the melt into a tough skinned and large cell cellular sheet by delivering the melt into and through the die slot at a rate expanding the melt within the die slot under reduced pressure to produce a major portion of the foaming expansion and the tough skin from collapsed cells within the die slot, delivering the expanded material from the die slot through an expansion chamber slightly larger than the die slot to complete foaming of the mass, and recovering the substantially solidified tough skinned and large cell foamed sheet material from the expansion chamber at a rate assuring the major portion of foaming within the die slot and substantial completion of foaming within the expansion chamber and insufficient to cancel the back pressure which prevents significant foaming of the mass in the extruder before reaching the die slot, said amount of nucleating agent being correlated inversely with the size of the cells in the resulting foam.

2. The method of claim 1 wherein the foaming in the die slot is sufficient to produce an average cell diameter of at least .025 inch and a ratio of sheet thickness to average cell diameter in the range of about 1.5 to 1 to 10 to 1.

3. The method of claim 1 wherein about 85% of the total foaming is carried out in the die slot.

4. The method of claim 1 wherein said polyolefin is polypropylene.

5. The method of claim 1 wherein said nucleating agent is also a mold lubricant.

References Cited

UNITED STATES PATENTS

| 2,537,977 | 1/1951 | Dulmage | 264—53 |
| 2,872,965 | 2/1959 | Sisson | 264—47 |
| 2,994,110 | 8/1961 | Hardy. | |
| 3,015,873 | 1/1962 | Dietzsch et al. | 264—50 XR |
| 3,026,272 | 3/1962 | Rubens et al. | 244—53 XR |
| 3,058,161 | 10/1962 | Beyer et al. | |

(Other references on following page)

| | | |
|---|---|---|
| 3,121,130 | 2/1964 | Wiley et al. _____ 264—53 |
| 3,275,720 | 9/1966 | Ohsol _____ 264—54 XR |
| 3,309,439 | 3/1967 | Nonweiler _____ 264—45 |
| 3,310,617 | 3/1967 | Dygert et al. _____ 264—53 |
| 3,345,439 | 10/1967 | Everard et al. _____ 156—79 XR |
| 3,063,095 | 11/1962 | Limbach. |
| 3,125,620 | 3/1964 | Skinner. |
| 3,227,784 | 1/1966 | Blades et al. |
| 3,271,495 | 9/1966 | Gronholz et al. _____ 264—210 |
| 3,317,363 | 5/1967 | Weber. |
| 3,300,554 | 1/1967 | Bachus _____ 264—47 |

FOREIGN PATENTS 582,114   8/1959   Canada.

ROBERT F. BURNETT, Primary Examiner

W. W. SCHWARZE, Assistant Examiner

U.S. Cl. X.R.

18—12; 161—161; 264—48, 50, 53, 55, 177